United States Patent
Waikhom et al.

(10) Patent No.: US 9,100,724 B2
(45) Date of Patent: Aug. 4, 2015

(54) METHOD AND APPARATUS FOR DISPLAYING SUMMARY VIDEO

(75) Inventors: Bimolchand Singh Waikhom, Suwon-si (KR); Hyo-sang Bang, Seoul (KR); Jung-ah Seung, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/567,390

(22) Filed: Aug. 6, 2012

(65) Prior Publication Data

US 2013/0071088 A1    Mar. 21, 2013

Related U.S. Application Data

(60) Provisional application No. 61/536,671, filed on Sep. 20, 2011.

(30) Foreign Application Priority Data

Dec. 12, 2011  (KR) .......................... 10-2011-0133050

(51) Int. Cl.
  *H04N 5/262*   (2006.01)
  *H04N 21/8549*  (2011.01)

(52) U.S. Cl.
  CPC ......... *H04N 21/8549* (2013.01); *H04N 5/2621* (2013.01)

(58) Field of Classification Search
  USPC .......................................... 386/241; 725/105
  See application file for complete search history.

(56) References Cited

U.S. PATENT DOCUMENTS

| | | | |
|---|---|---|---|
| 8,078,603 B1 * | 12/2011 | Chandratillake et al. ...... | 707/706 |
| 2003/0052986 A1 | 3/2003 | Matsumoto | |
| 2006/0050166 A1 | 3/2006 | Sonoda et al. | |
| 2006/0165383 A1 | 7/2006 | Park et al. | |
| 2006/0284994 A1 | 12/2006 | Kim | |
| 2007/0074115 A1 * | 3/2007 | Patten et al. ................... | 715/716 |
| 2007/0237225 A1 * | 10/2007 | Luo et al. ................. | 375/240.12 |
| 2008/0034325 A1 * | 2/2008 | Ording .......................... | 715/838 |
| 2009/0309988 A1 | 12/2009 | Kubo et al. | |
| 2010/0284667 A1 * | 11/2010 | Yahata et al. .................. | 386/241 |
| 2011/0102616 A1 | 5/2011 | Migiyama et al. | |
| 2011/0193984 A1 * | 8/2011 | Kitaya et al. ............... | 348/222.1 |

FOREIGN PATENT DOCUMENTS

| | | |
|---|---|---|
| JP | 2003-196638 A | 7/2003 |
| KR | 10-2006-0085155 A | 7/2006 |
| KR | 1020100123204 A | 11/2010 |

OTHER PUBLICATIONS

Search Report established for EP 12185000.2 (Aug. 28, 2013).
Extended European Search Report issued for EP 12185157.0 (Jun. 30, 2014).

* cited by examiner

*Primary Examiner* — Roberto Velez
*Assistant Examiner* — Stephen Coleman
(74) *Attorney, Agent, or Firm* — Drinker Biddle & Reath LLP

(57) ABSTRACT

A method and apparatus are provided for displaying a summary video. According to the method, various effects may be automatically determined according to an attribute of a file, and a video may be automatically summarized to have various effects and be displayed.

5 Claims, 13 Drawing Sheets

METHOD AND APPARATUS FOR DISPLAYING SUMMARY VIDEO

CROSS-REFERENCE TO RELATED PATENT APPLICATION

This application claims the benefits of U.S. Provisional Application No. 61/536,671, filed on Sep. 20, 2011, in the United States Patent Trademark Office and Korean Patent Application No. 10-2011-0133050, filed on Dec. 12, 2011, in the Korean Intellectual Property Office, the disclosure of which is incorporated herein in its entirety by reference.

BACKGROUND

Disclosed herein are a method and apparatus for displaying a summary video.

In general, digital photographing apparatuses, such as digital cameras or camcorders, display an image and a video stored in a recording medium on a display screen in a reproducing mode. Also, a plurality of pieces of data including captured images and videos may be related to one another.

Many videos have appeared due to an increase in mass multimedia databases and development of communication and digital media processing technologies, and thus efforts to provide user convenience and satisfaction are increasing through a searching service based on contracted summary information of videos. However, up until now, a person has had to contract video summary information by directly selecting appropriate scenes or images in the videos.

Recently, as various types of businesses related to videos have been developed, the need to automatically analyze a large number of videos is increasing, and thus research is being widely conducted to solve such a problem. Examples of a method of contracting a video include a video skimming method, a highlight method, and a video summarizing method. Regarding the highlight method, interesting parts based on a specific event are selected from a video and contracted. Regarding the video summarizing method, significant content and structural information regarding a video are mainly selected, and a result of the video summarizing is generally represented in the form of sequence of key frames of main still images. Until now, most research into video contraction aims to generate video summary information. A video summary represented by key frames allows a user to ascertain overall video content at a glance, and also scenes or shots including the key frame function as entries. Accordingly, a video summary operation may be regarded as an operation for selecting an optimum key frame or an operation for selecting a segment where an optimum key frame is positioned, and visual features, such as colors, movements, or the like, may be generally used as important requirements in selecting a key frame.

SUMMARY

Various embodiments of the invention provide a method and apparatus for displaying a summary video that may automatically determine various effects according to a file attribute and may automatically summarize a video to have the various effects and display a video summary.

According to an embodiment of the invention, there is provided a method of displaying a summary video, the method including: selecting a file including a video or an image; and determining different effects according to an attribute of the selected file and displaying a summary video to which a determined effect is applied, wherein the attribute of the file is information regarding a related image included in the file.

The related image may be an image captured during recording of the video.

The information regarding the related image may include information regarding a time when the related image is captured.

The information regarding the related image may include a number of the related images.

The information regarding the related image may be stored in a header of the video file.

The method may further include, when the selected file is an image file, generating a summary video to which different effects are applied according to a photographing type of the image.

The photographing type may be any one selected from the group consisting of a panoramic photographing type, a continuous photographing type, and a high-speed photographing type.

The method may further include, when the selected file is a video and when there is no related image included in the video, generating a summary video to which different effects are applied according to a reproducing time of the video.

When the selected file is a video, when a number of related images included in the video is equal to or greater than a first threshold value, and when a time interval between an initial related image and a final related image is equal to or greater than a second threshold value, the summary video is generated in such a way that the video is displayed on a first area of a display screen and the related image is displayed on a second area of the display screen while being slid in one direction.

When the time interval between an initial related image and a final related image is less than the second threshold value, the summary video may be generated in such a way that the video is displayed on the display screen and the related image pops up at a time when the related image is captured to be overlapped with the displayed video and then disappear.

When the selected file is a video, when a number of related images included in the video is equal to or greater than a second threshold value and less than the first threshold value, the summary video is generated in such a way that the video is displayed on the display screen and the related image pops up at a time when the related image is captured to be overlapped with the displayed video and then disappear.

The method may further include inputting a theme of the summary video; and generating a summary video to which a predetermined effect is applied according to the input theme.

The method may further include extracting a key segment from the video based on information regarding the related image; and generating the summary video using the extracted key segment and the determined effect.

The method may further include extracting key segments from the video based on information regarding a time when each of the related images is captured; determining an effect to be applied to the summary video from at least one selected from the group consisting of a number of the related images and the time interval between the related images; and generating a summary video to which the extracted key segments and the determined effect are applied.

According to another embodiment of the invention, there is provided a method of generating a summary video, the method including: receiving a video and analyzing an attribute of a video file of the input video; extracting a key segment from the video file according to the attribute; determining different effects according to the attribute; and generating a summary video to which the extracted key segment and a determined effect are applied, wherein the attribute of the video file is information regarding a related image included in the video file.

The related image may be an image captured during recording of the video.

The information regarding the related image may include at least one selected from the group consisting of information regarding a time when the related image is captured and a number of the related images.

The information regarding the related image may be stored in a header of the video file.

According to another embodiment of the invention, there is provided a summary video display apparatus including: a selecting unit for selecting a file including a video or an image; and a controller for determining different effects according to an attribute of the selected file and displaying a summary video to which a determined effect is applied, wherein the attribute of the file is information regarding a related image included in the file.

The information regarding the related image may be stored in a header of a video file of the video.

The controller may include: a file attribute determining unit for determining an attribute of the selected file; an extracting unit for extracting information regarding an image related to the video when the selected file is a video; an effect determining unit for determining an effect to be applied to the summary video based on the determined attribute of the file and the information regarding the related image; and a summary video generating unit for generating a summary video according to the determined effect.

The extracting unit may extract a key segment of the video based on time information of the related image.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
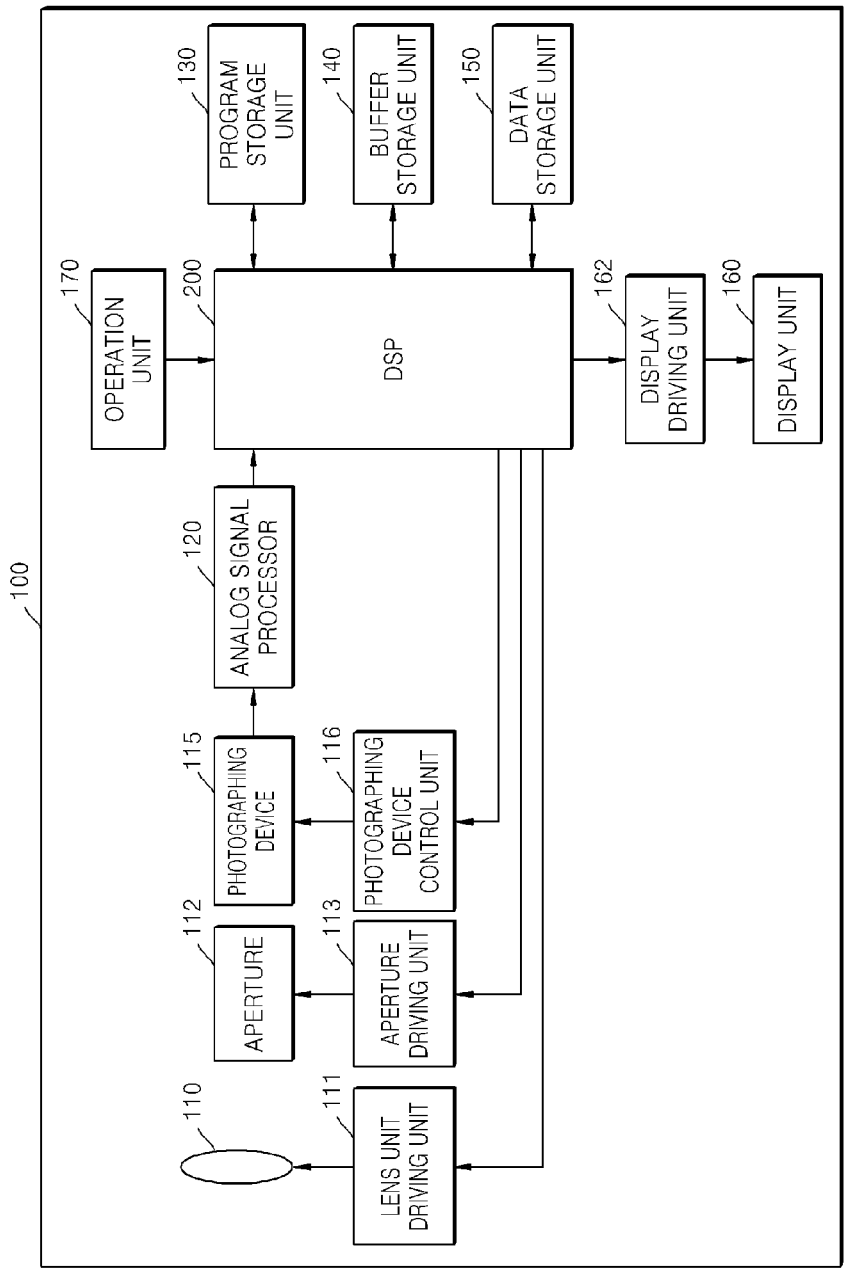
FIG. 1 is a schematic block diagram of a digital camera which is an example of a display apparatus according to an embodiment of the invention.

Hereinafter, various embodiments of the invention will be described in detail with reference to the accompanying drawings. However, the invention is not limited thereto and it will be understood that various changes in form and details may be made therein without departing from the spirit and scope of the following claims. That is, descriptions of particular structures or functions may be presented merely for explaining exemplary embodiments of the invention. In the following description, when detailed descriptions about related well-known functions or structures are determined to make the invention unclear, the detailed descriptions will be omitted herein.

The terms such as "first" and "second" are used herein merely to describe a variety of constituent elements, but the constituent elements are not limited by the terms. The terms are used only for the purpose of distinguishing one constituent element from another constituent element.

The terms used in the present specification are used for explaining a specific exemplary embodiment, and do not limit the invention. Thus, the expression of a singularity in the present specification includes the expression of a plurality unless clearly specified otherwise in context. Also, terms such as "include" or "comprise" may be construed to denote a certain characteristic, number, step, operation, constituent element, or a combination thereof, but may not be construed to exclude the existence of or a possibility of an addition of one or more other characteristics, numbers, steps, operations, constituent elements, or combinations thereof.

Like reference numerals in the drawings denote like elements. Redundant descriptions of like elements will be omitted herein. As used herein, the term "and/or" includes any and all combinations of one or more of the associated listed items. Expressions such as "at least one of," when preceding a list of elements, modify the entire list of elements and do not modify the individual elements of the list.

FIG. 1 is a schematic block diagram of a digital camera 100 which is an example of a display apparatus, according to an embodiment of the invention.

A digital camera 100 is described below as an example of a display apparatus according to an embodiment of the invention. However, the display apparatus is not limited to the digital camera 100 of FIG. 1 and may be applied not only to portable apparatuses such as camera phones, personal digital assistants (PDAs), portable multimedia players (PMPs) or camcorders, but also to home appliances such as televisions (TVs) or monitors that have a display function for displaying all types of content.

The digital camera 100 according to the present embodiment may include a lens unit 110, a lens unit driving unit 111, an aperture 112, an aperture driving unit 113, a photographing device 115, a photographing device controller 116, an analog signal processor 120, a program storing unit 130, a buffer storing unit 140, a data storing unit 150, a display driving unit 162, a display unit 160, a digital signal processor (DSP) 200, and an operation unit 170. The lens unit 110, the lens unit driving unit 111, the aperture 112, the aperture driving unit 113, the photographing device 115, the photographing device controller 116, and the analog signal processor 120 may be referred to collectively as a photographing unit.

The lens unit 110 focuses an incident light. The lens unit 110 includes a zoom lens for controlling a viewing angle to be increased or decreased according to a focal length and a focus lens for adjusting a focus of an object. The zoom lens and the focus lens each may be formed of a single lens or a group of a plurality of lenses. The aperture 112 adjusts an amount of incident light according to a degree of opening thereof.

The lens unit driving unit 111 and the aperture driving unit 113 receive a control signal from the DSP 200 and respectively drive the lens unit 110 and the aperture 112. The lens unit driving unit 111 adjusts the focal length by controlling a position of a lens to perform operations of auto-focusing, zoom change, and focus change. The aperture driving unit 113 adjusts the degree of opening of the aperture 112 to perform operations of auto-focusing, auto-exposure correction, focus change, and adjustment of depth of field, in particular, by controlling an f-number or a value of the aperture.

An optical signal passing through the lens unit 110 forms an image of an object on a light receiving surface of the photographing device 115. The photographing device 115 may use a charge coupled device (CCD), a complementary metal oxide semiconductor image sensor (CIS), or a high speed image sensor for converting an optical signal to an electric signal. A sensitivity of the photographing device 115 may be adjusted by the photographing device controller 116. The photographing device controller 116 may control the photographing device 115 according to a control signal that is automatically generated by an image signal that is input in real time or a control signal that is manually input by an operation of a user. An exposure time of the photographing device 115 is adjusted by a shutter (not shown). The shutter includes a mechanical shutter for adjusting incidence of light by moving a blind and an electronic shutter for controlling exposure by applying an electric signal to the photographing device 115.

The analog signal processor 120 performs noise reduction processing, gain control, waveform shaping, and analog-digital conversion processing on an analog signal applied by the photographing device 115.

The operation unit 170 is used to input an external control signal, for example, by a user. The operation unit 170 may include a shutter-release button for inputting a shutter-release signal for capturing an image by exposing the photographing device 115 to light for a predetermined time, a power button for inputting a control signal for controlling on/off of power, a wide zoom button and a tele-zoom button for increasing or decreasing a viewing angle according to an input, and a variety of function buttons for selecting a mode such as a text input mode, a photographing mode, a reproducing mode, a white balance setting mode, or an exposure setting mode. The operation unit 170 may have a variety of types of buttons as above, but the invention is not limited thereto. For example, the operation unit 170 may be embodied in various ways such as by using a keyboard, a touch pad, a touch screen, or a remote controller, which may be used by a user to input data. In the current embodiment, a user inputs a data display operation through a touch pad or a touch screen included in the display unit 160.

The digital camera 100 of the current embodiment generates a summary video file by extracting a key segment of a video based on information about a time when a still image is captured during recording of the video. The digital camera 100 may capture still images during recording of a video. For example, a video photographing button, e.g., an REC button, included in the digital camera 100 is pressed to start recording of a video, and when a scene to be recorded as a still image is captured during the recording of the video, a still image photographing button, e.g., a shutter release button, is pressed to capture the still image. For example, if five still images are captured while recording the video for one minute, a one-minute video file and five still image files are generated. For example, a video file is stored in a recording medium, such as a secure digital (SD) card, in any of various video file formats, for example, in an MPEG-4 Part 14 (MP4) file format, a windows media audio (WMV) file format, or the like, and a still image file is stored in a recording medium in a joint photographic experts group (JPEG) file format. In the current embodiment, in order to generate and display a summary video, information regarding a still image related to a recorded video is stored in a header of a video file. That is, information regarding a still image file corresponding to information regarding a time when the still image is captured is stored in the header of the video file as metadata. For example, regarding an MP4 file, a free tag may be used. Also, the digital camera 100 of the current embodiment may reproduce a video and a still image. For this, the digital camera 100 may include a video decoder and a still image decoder, and may further include a video encoder for generating a summary video.

The digital camera 100 includes a program storing unit 130 for storing a program such as an operation system for driving the digital camera 100 or an application system, a buffer storing unit 140 for temporarily storing data needed for performing an operation or resultant data, and a data storing unit 150 for storing various information needed for the program, such as an image file having an image signal.

The digital camera 100 includes the display unit 160 for displaying an operation state of the digital camera 100 or a still image or a video captured by the digital camera 100. The display unit 160 may provide visual information and auditory information to a user. To provide visual information, the display unit 160 may include, for example, a liquid crystal display (LCD) panel or an organic light emitting display (OLED) panel. The display driving unit 162 provides a driving signal to the display unit 160.

The digital camera 100 includes the DSP 200, which processes input image signals and controls each element according to a processed input image signal or an external input signal. The DSP 200 may reduce noise of input image data and perform image signal processing for improving image quality, such as gamma correction, color filter array interpolation, color matrix, color correction, or color enhancement. Also, the DSP 200 may generate an image file by compressing image data generated by performing the image signal processing for improving image quality, or restore image data from an image file. An image compression format may be a reversible (lossless) format or an irreversible (lossy) format. Compressed data may be stored in the data storing unit 150. Also, the DSP 200 may functionally perform sharpness processing, color processing, blur processing, edge emphasis processing, image interpretation processing, image recognition processing, or image effect processing. Face recognition or scene recognition processing may be performed as the image recognition processing. For example, luminance level control, color correction, contrast control, contour emphasis control, screen division processing, or character image generation and synthesis processing may also be performed.

Also, the DSP 200 may generate a control signal to control auto-focusing, zoom change, focus change, or auto-exposure correction by executing a program stored in the program storing unit 130 or using a separate module, and provide a generated control signal to the lens unit driving unit 111, the aperture driving unit 113, and the photographing device controller 116, so that operations of elements, such as a shutter or a flash provided in the digital camera 100, may be generally controlled. Hereinafter, the DSP 200 shown in FIG. 1 will be described in detail with reference to FIGS. 2 and 3.

Figure 2:
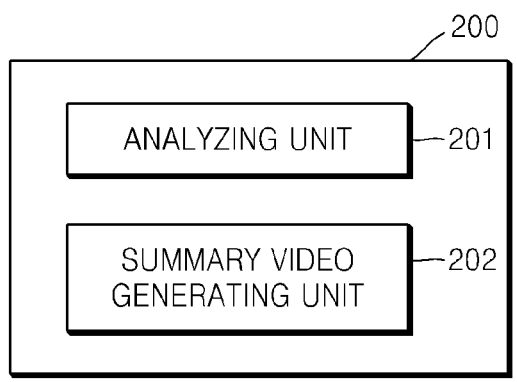
FIG. 2 is a schematic block diagram of a digital signal processor shown in FIG. 1.

Referring to FIG. 2, the DSP 200 includes an analyzing unit 201 and a summary video generating unit 202. Here, the DSP 200 may be understood to have the same meaning as a controller used in the claims. A user selects a file including a video or an image in the DSP 200. Here, the user may select a video or a still image to be summarized through the operation unit 170. Also, in the DSP 200, a video or a still image is not manually selected by a user, and a video or a still image that is arbitrarily or automatically determined may be selected. The DSP 200 determines different effects according to a file attribute. Here, the file attribute includes information regarding whether a selected file is a video or a still image. Also, when the selected file is a video, the file attribute may include information regarding whether there is a related image, information regarding a number of related images, and time information regarding a related image. Also, when there is no related image, a file attribute may be a length of the video or a reproducing time of the video. In this regard, the related image may be a still image captured during recording of the video. The file attribute may include information regarding whether there is a still image captured during recording of a video, information regarding a number of still images, and information regarding a time when each still image is captured. Such a file attribute may be analyzed from information regarding a related image included in a header of a video file.

Also, when the selected file is a still image, a file attribute includes a photographing type of the still image. For example, the photographing type includes a panoramic photographing type, a high-speed photographing type, and a continuous photographing type. However, the invention is not limited thereto, and any of various photographing types may be used. Information regarding a photographing type may be analyzed from image capture information regarding a still image or an exchangeable image file format (Exif).

The DSP 200 analyzes a file attribute and applies different effects according to the file attribute. Here, the effects may include various effects such as a hybrid effect, a general video effect, a panoramic image effect, a folder image effect, a single image effect, and the like, and a summary video effect will be described later.

A video or a still image is selected in the analyzing unit 201 by a user to generate a summary video, and the analyzing unit 201 analyzes the selected video or still image. Here, the analyzing of the video or the still image means analyzing with respect to each file. For example, regarding a video, the analyzing unit 201 analyzes a header of a video file to ascertain whether the selected video has a related image, a number of related images, a time interval between an initial image and a final image, and if there is no related image, whether a video reproducing time is long or short.

Figure 3:
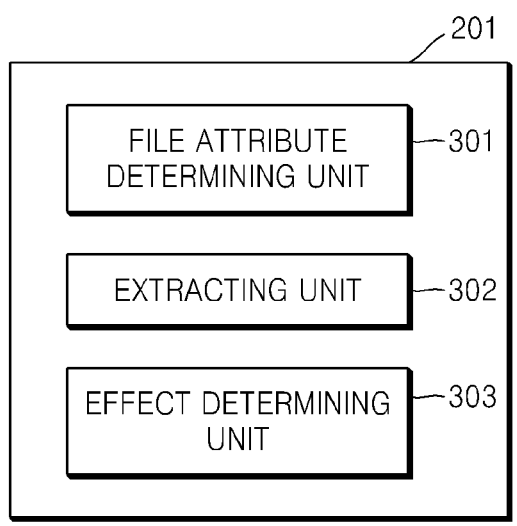
FIG. 3 is a schematic block diagram of an analyzing unit shown in FIG. 2.

Referring to FIG. 3, the analyzing unit 201 includes a file attribute determining unit 301, an extracting unit 302, and an effect determining unit 303.

The file attribute determining unit 301 determines a file attribute of an input or selected video or still image. The file attribute may be determined by analyzing a header of an input file. The file attribute includes information regarding whether the input image is a video or a still image. Also, when the input image is a video, the file attribute may include information regarding whether there is a related image, information regarding a number of related images, and time information regarding a related image. When the input image is a still image, the file attribute may include information regarding whether a photographing type is a panoramic photographing type, a high-speed photographing type, or a continuous photographing type.

The extracting unit 302 extracts information regarding an input video and a related image. Also, the extracting unit 302 extracts a key segment of a video based on time information of a related image. Here, the related image may be a still image captured during recording of a video, and the time information includes a time when the still image is captured. For example, when a video is a ten-minute video, if a related image is captured at one minute, five minutes, and eight minutes, a key segment is extracted for thirty seconds both before and after the related image corresponding to one minute, that is, a key segment is extracted for a total of one minute, a key segment is extracted for thirty seconds both before and after the related image corresponding to five minutes, that is, a key segment is extracted for another one minute, and a key segment is extracted for thirty seconds both before and after the related image corresponding to eight minutes, that is, a key segment is extracted for another one minute. Accordingly, a time length of a summary video may be summarized to three minutes. Here, it has been described that a key segment of a video is extracted by distinguishing a predetermined time both before and after a related image based on information regarding a time when the related image is captured. However, the invention is not limited thereto, and another method of extracting a segment may be used.

The effect determining unit 303 determines an effect to be applied to a summary video based on a file attribute and information regarding a related image. For example, when there is a related image, the effect determining unit 303 determines a hybrid effect. When there are related images equal to or greater than a predetermined number and when a time interval between an initial image and a final image is equal to or greater than a predetermined period of time, the effect determining unit 303 determines a daily story effect. When there are related images equal to or greater than a predetermined number and when a time interval between an initial image and a final image is less than a predetermined period of time, the effect determining unit 303 determines a polaroid effect. When there are related images less than a predetermined number, the effect determining unit 303 also determines a polaroid effect. When there is no related image, the effect determining unit 303 determines a video effect. Also, when the input image is not a video, if a photographing type of a still image is a panoramic photographing type, the effect determining unit 303 determines a panoramic effect. If a photographing type of a still image is a high-speed/continuous photographing type, the effect determining unit 303 determines a folder image effect. If a photographing type of a still image is a general photographing type, the effect determining unit 303 determines a single image effect. Here, although the above-described effects have been described as examples, various other effects may be applied according to a file attribute and information regarding a related image.

Referring back to FIG. 2, the summary video generating unit 202 generates a summary video according to an effect determined by the effect determining unit 303. The summary video generating unit 202 analyzes a file attribute to be input and generates a summary video to which different effects are applied according to a result of the analysis. Here, the summary video may include a plurality of still images, or includes a video generated by extracting key segments of the video and combining the key segments. The summary video generating unit 202 may include a video decoder, a video encoder, and a still image decoder. The video decoder decodes a video from information regarding an extracted key segment of a video to be input, and the still image decoder decodes a still image from a still image to be input. The video encoder encodes summary video data generated using video data decoded according to information regarding an extracted key segment of a video, effect information data regarding application of an effect determined according to a file attribute, and/or decoded still image data.

For example, the video decoder decodes a video bit stream encoded in a compression format such as H.264, MPEG-4, or MPEG-2 into a YUV/RGB video frame format that is not compressed. The video encoder encodes the YUV/RGB video frame format in real time to a compression format such as H.264, MPEG-4, or MPEG-2. The still image decoder decodes encoded JPEG images to YUV/RGB images that are not compressed. Here, although it has been described that the above-described encoder and decoders are realized as software in the DSP 200, the above-described encoder and decoders may be realized as hardware.

Figure 4:
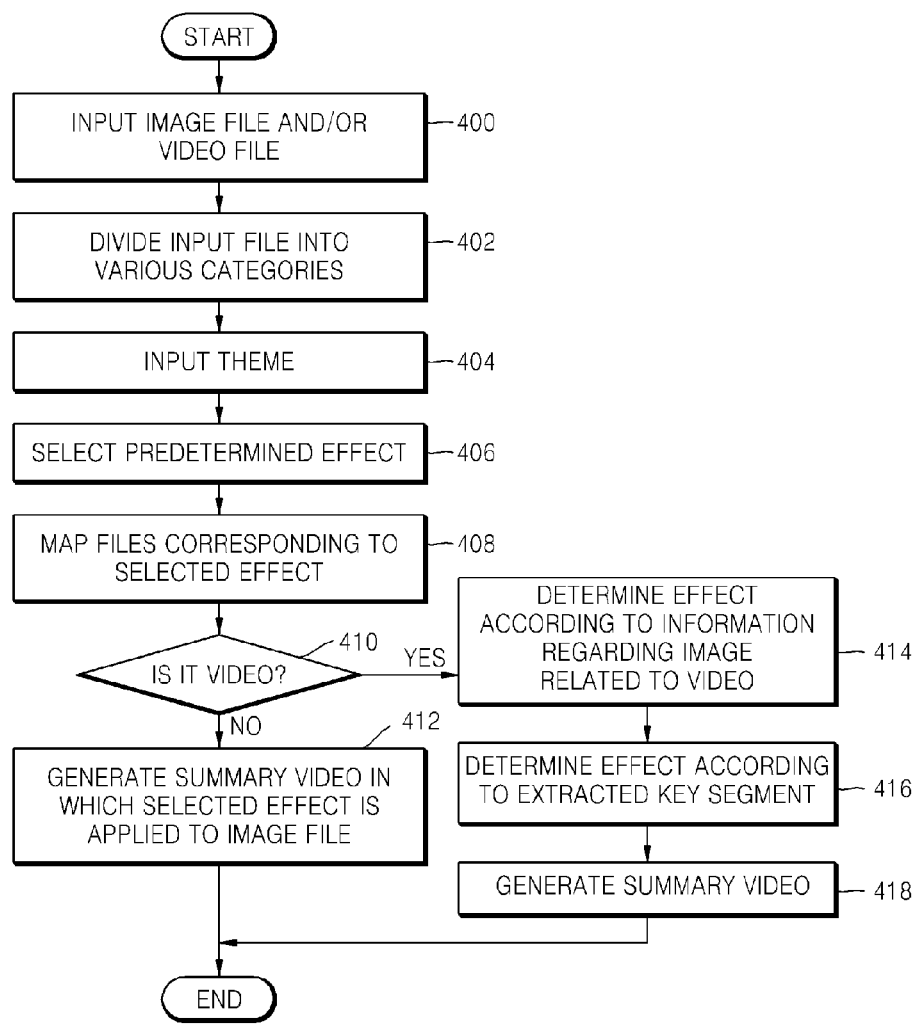
FIG. 4 is a flowchart for describing a method of generating a summary video according to another embodiment of the invention.

FIG. 4 is a flowchart for describing a method of generating a summary video according to another embodiment of the invention.

Referring to FIG. 4, in operation 400, an image and/or a video are/is input. Here, a user may select the image and the video together or individually. Also, a plurality of images or a plurality of videos may be selected. Here, the images and the videos may be manually input by a user or may be automatically set to be input.

In operation 402, files of an input image or an input video are divided into various categories. Here, the categories may be divided by analyzing a file attribute to be input. The file attribute may include information regarding whether an input file is a video or a still image. When the input file is a video, the file attribute may include information regarding whether there is a related image, information regarding a number of related images, and time information regarding a related image. When the input file is a still image, the file attribute may include information regarding whether a photographing type of the still image is a panoramic photographing type, a high-speed photographing type, or a continuous photographing type.

In operation 404, a theme is input by a user. Here, the theme means an overall atmosphere of a summary video to be summarized. For example, the theme may include happiness, naturalness, sadness, and the like.

In operation 406, a predetermined effect is selected. The effect of a summary video that is appropriate for the theme selected in operation 404 is selected.

In operation 408, files corresponding to the selected effect are mapped. Here, a video or an image file for applying the selected effect is determined.

Here, in operations 404 to 408, selection of the theme and application of the effect according to the selected theme are provided as default to generate a summary video, and the summary video may be generated except for operations 404 to 408.

In operation 410, it is determined whether the file input in operation 400 is a video. If the input file is not a video, a summary video in which the selected effect is applied to an image file is generated in operation 412. Here, there are a plurality of the images files, and the summary video is generated by applying the effect determined in operations 404 to 408 to the image files. Also, a length or a reproducing time of the summary video and a size of the summary video, e.g., 1280×1080, 640×480, or 320×240, are input by a user to be used to generate the summary video.

In operation 410, when the input file is a video, a key segment of a video is extracted in operation 414. Here, the key segment is a unit for forming a summary video and is an important part or a part of interest. The key segment is extracted from a video file based on time information of a related image included in a header of the video file. For example, when the video file is a ten-minute video file, if a related image is captured at one minute, five minutes, and eight minutes, a key segment is extracted for thirty seconds both before and after the related image corresponding to one minute, that is, a key segment is extracted for a total of one minute, a key segment is extracted for thirty seconds both before and after the related image corresponding to five minutes, that is, a key segment is extracted for another one minute, and a key segment is extracted for thirty seconds both before and after the related image corresponding to eight minutes, that is, a key segment is extracted for another one minute. Accordingly, a three-minute summary video may be generated by synthesizing the above-described key segments.

In operation 416, an effect is determined according to information regarding an image related to a video. For example, when there is a related image, a hybrid effect is determined. When there are related images equal to or greater than a predetermined number and when a time interval between an initial image and a final image is equal to or greater than a predetermined period of time, a daily story effect is determined. When there are related images equal to or greater than a predetermined number and when a time interval between an initial image and a final image is less than a predetermined period of time, a polaroid effect is determined. When there are related images less than a predetermined number, a video effect is determined.

In operation 418, a summary video to which the key segment extracted in operation 414 and the effect determined in operation 416 are applied is generated.

Figure 5:
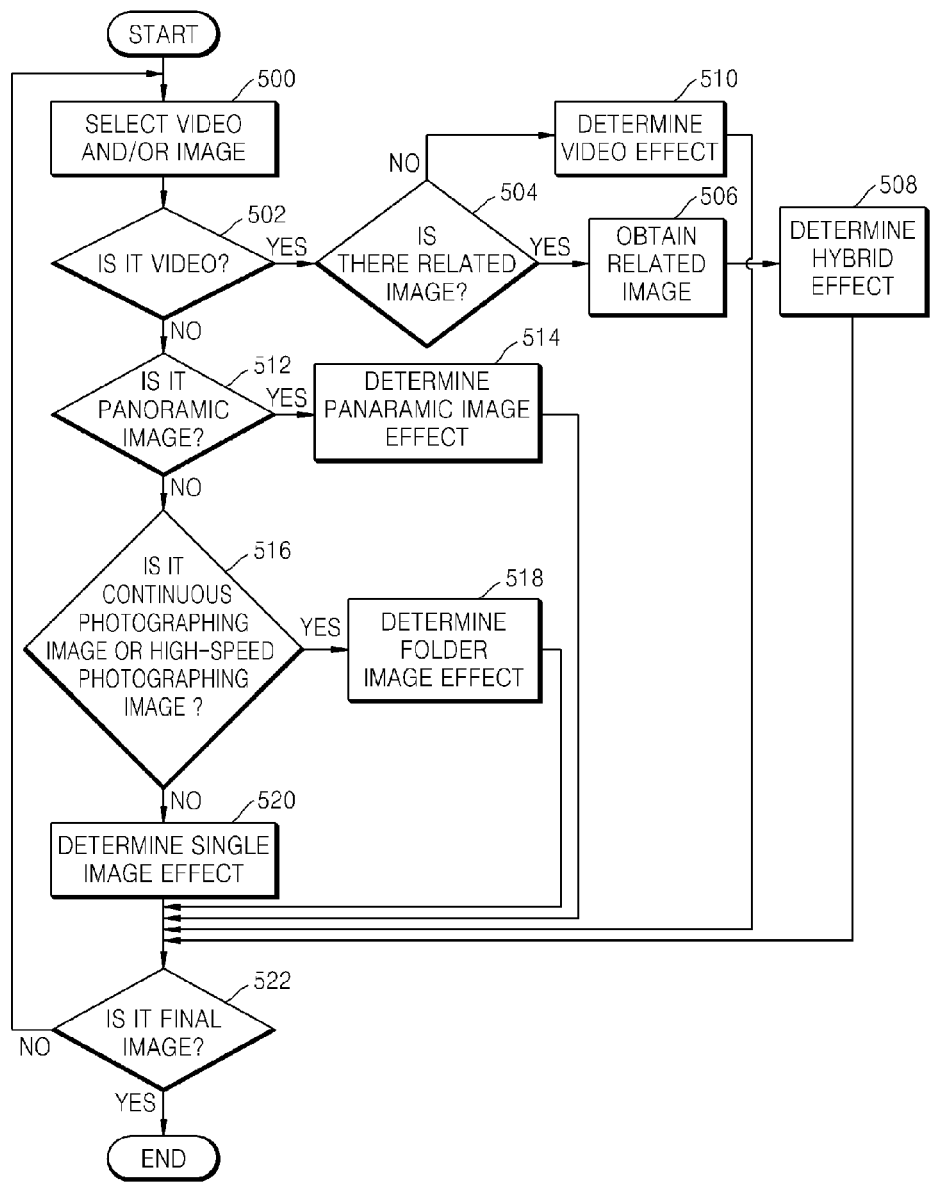
FIG. 5 is a flowchart for describing a method of applying an effect according to a file attribute according to another embodiment of the invention.

FIG. 5 is a flowchart for describing a method of applying an effect according to a file attribute according to another embodiment of the invention.

Referring to FIG. 5, in operation 500, a video and/or an image are/is selected. If a video is selected in operation 502, it is determined whether there is a related image in operation 504. The determining may be performed by ascertaining whether time information regarding the related image is stored in a header of a video file. Here, the related image may be an image captured during recording of the video. Alternatively, the related image is related to the recorded video and may be an image set by a user.

In operation 504, it is determined whether there is a related image. If there is a related image, the related image is obtained in operation 506. Since information regarding the related image is stored in a header of a video file, an image file stored in a recording medium (not shown) may be invoked from information regarding the related image. If there is a related image, a hybrid effect is determined in operation 508, and then the method proceeds to operation 522.

In operation 504, it is determined whether there is a related image. If there is no related image, a video effect is determined in operation 510, and then the method proceeds to operation 522.

If an image is selected in operation 502, it is determined whether the image is a panoramic image in operation 512. The determining may be performed using EXIF information of an image file. If it is determined that the image is a panoramic image in operation 512, a panoramic image effect is determined in operation 514, and then the method proceeds to operation 522.

If it is determined that the image is not a panoramic image in operation 512, it is determined whether the image is a continuous photographing image or a high-speed photographing image. The determining may be performed using EXIF information of an image file. If it is determined that the image is a continuous photographing image or a high-speed photographing image in operation 516, a folder image effect is determined in operation 518, and then the method proceeds to operation 522.

If it is determined that the image is not a continuous photographing image or a high-speed photographing image in operation 516, a single image effect is determined in operation 520.

In operation 522, if the image file is a final image file, the method ends. If it is not a final image file, the method returns to operation 500.

Figure 6:
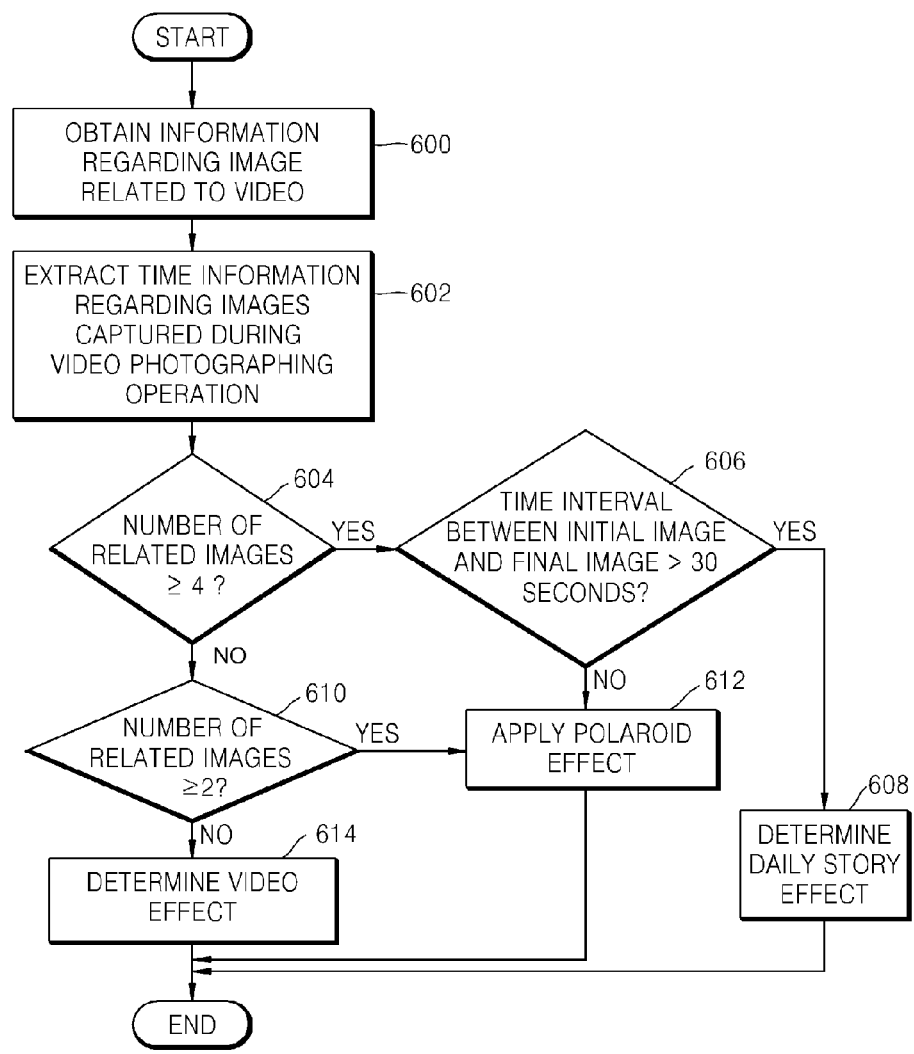
FIG. 6 is a flowchart for describing a method of applying an effect according to a file attribute according to another embodiment of the invention.

FIG. 6 is a flowchart for describing a method of applying an effect according to a file attribute according to another embodiment of the invention.

Referring to FIG. 6, in operation 600, information regarding an image related to a video is obtained. In operation 602, time information regarding images captured during a video photographing operation is obtained. In operation 604, it is determined whether there are related images equal to or greater than four. Here, the determining of whether there are related images equal to or greater than four may be arbitrarily performed, and the invention is not limited thereto. In operation 604, if there are related images equal to or greater than four, it is determined that a time interval between an initial image and a final image is equal to or greater than thirty seconds. Similarly, the determining of whether the time interval is equal to or greater than thirty seconds may be arbitrarily performed, and the invention is not limited thereto. In operation 606, if the time interval is equal to or greater than thirty seconds, the method proceeds to operation 608, and then a daily story effect is determined. Hereinafter, a summary video to which the daily story effect is applied will be described with reference to FIGS. 10 and 11.

Figure 10:
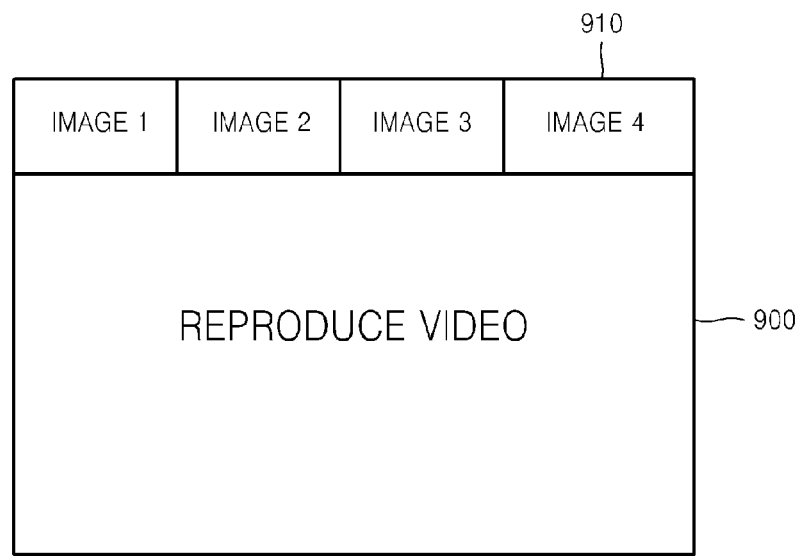
FIGS. 10 to 11F are views for describing a summary video to which a daily story effect is applied according to another embodiment of the invention.
Figure 11A:
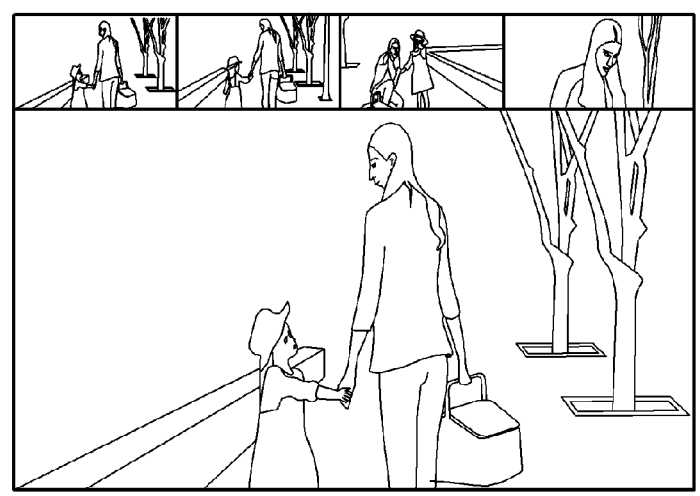
Figure 11B:
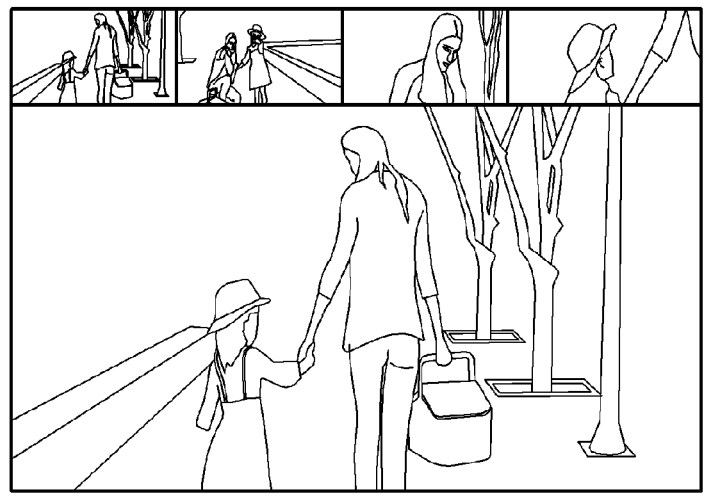
Figure 11C:
Figure 11D:
Figure 11E:
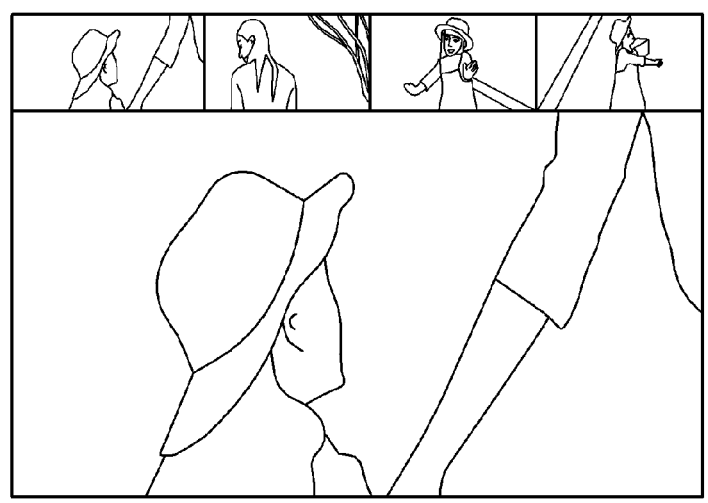
Figure 11F:

Referring to FIG. 10, a video 1000 is reproduced on a first area of a display screen. Then, first to fourth related images 1010 to 1040 are displayed while being slid from the right to the left at an upper side of the display screen.

As shown in FIGS. 11A to 11F, a video in which a day's time variation is summarized and is reproduced on a first area. Related images are arranged in the order of photographing times and displayed on a second area while being slid from the left to the right. Here, the related images are thumbnail images, and a time when the related images are slid is synchronized with a screen converting time of the video to be reproduced on the first area.

In operation 606, if the time interval is equal to or less than thirty seconds, a polaroid effect is determined in operation 612.

In operation 604, if there are related images equal to or less than four, it is determined whether there are related images equal to or greater than two in operation 610. If there are related images equal to or greater than two, a polaroid effect is determined in operation 612. Hereinafter, a summary video to which the polaroid effect is applied will be described with reference to FIGS. 8 and 9.

Figure 8:
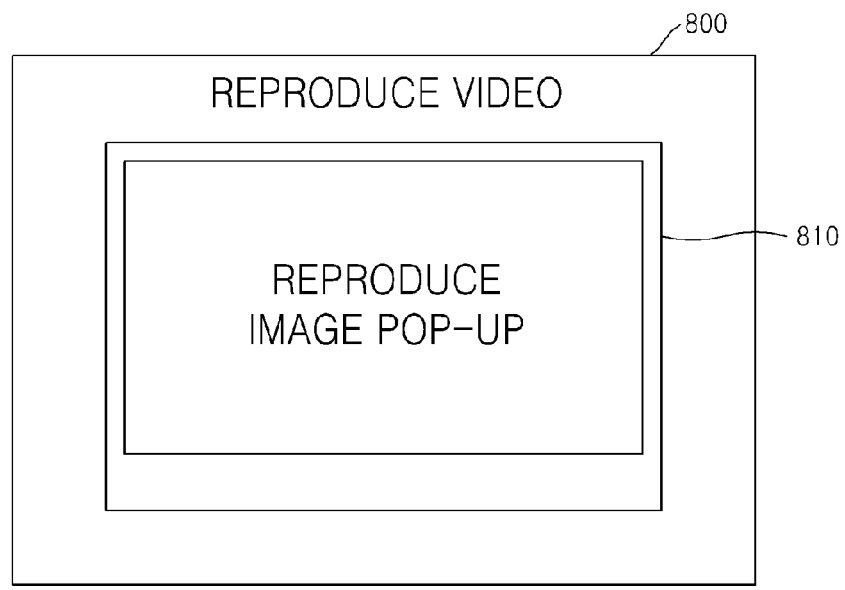
FIGS. 8 to 9E are views for describing a summary video to which a polaroid effect is applied according to another embodiment of the invention.

Referring to FIG. 8, a summary video to which a polaroid effect is applied is displayed. A video 800 is reproduced on a first area of a display screen, and a related image 810 pops up in the middle of the display screen at a time when a related image is captured, and the related image 810 is displayed.

Figure 9A:
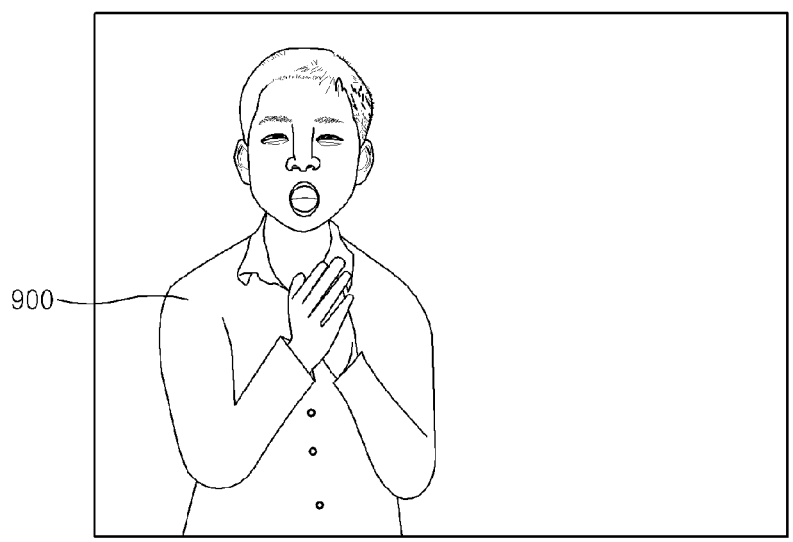
Figure 9B:
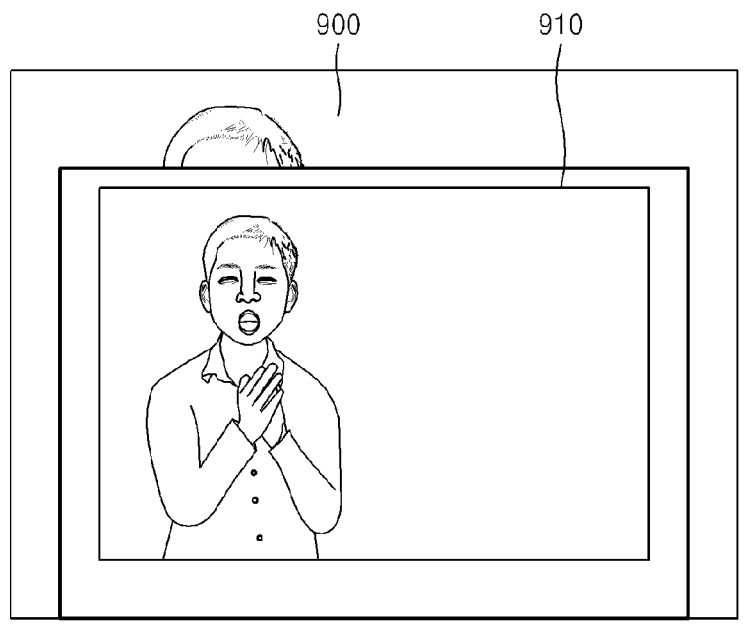
Figure 9C:
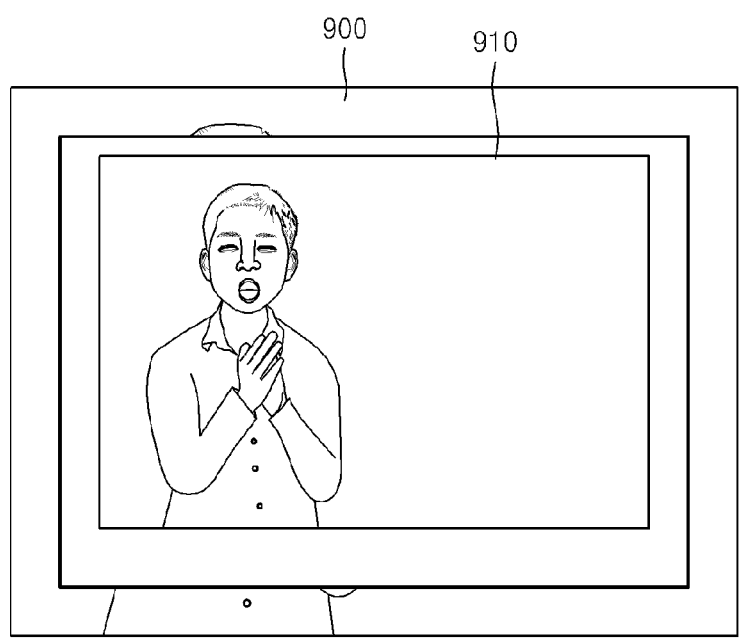
Figure 9D:
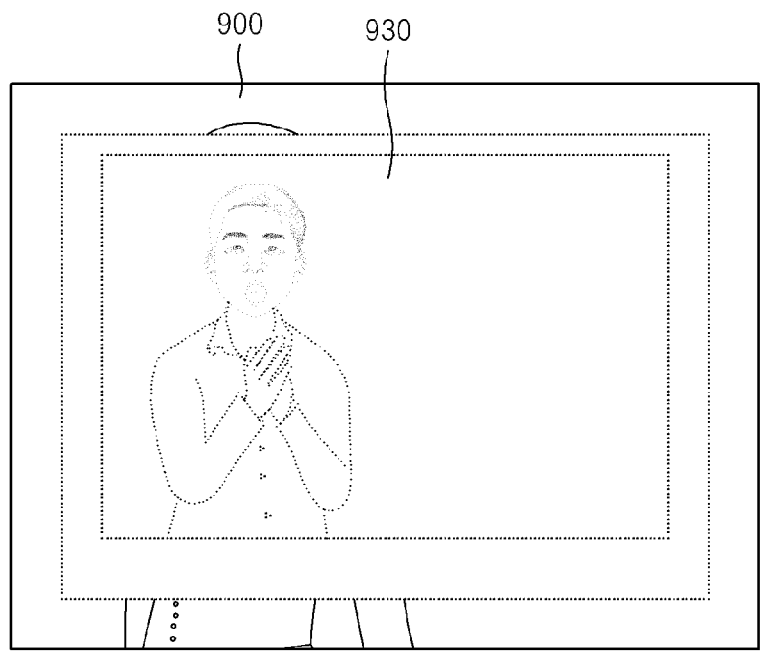
Figure 9E:
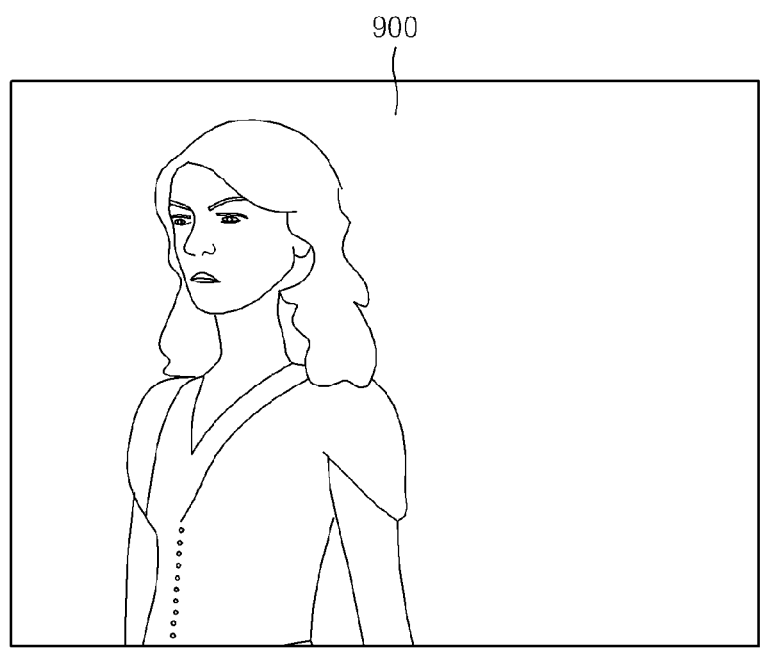

Referring to FIG. 9A, a video 900 is reproduced. In FIGS. 9B and 9C, a related image 910 is displayed at a time when the related image 910 is captured, and the related image 910 is displayed like a Polaroid photo. In FIG. 9D, a displayed related image 930 disappears. In FIG. 9E, the video 900 is reproduced.

In operation 610, when there are related images equal to or less than two, a video effect is determined in operation 614. Here, the video effect means that an image is processed as a normal video. Regarding the video effect, a time when one related image is captured is an intermediate point of a video, a key segment is extracted for ten seconds based on the intermediate point to generate a summary video.

Figure 7:
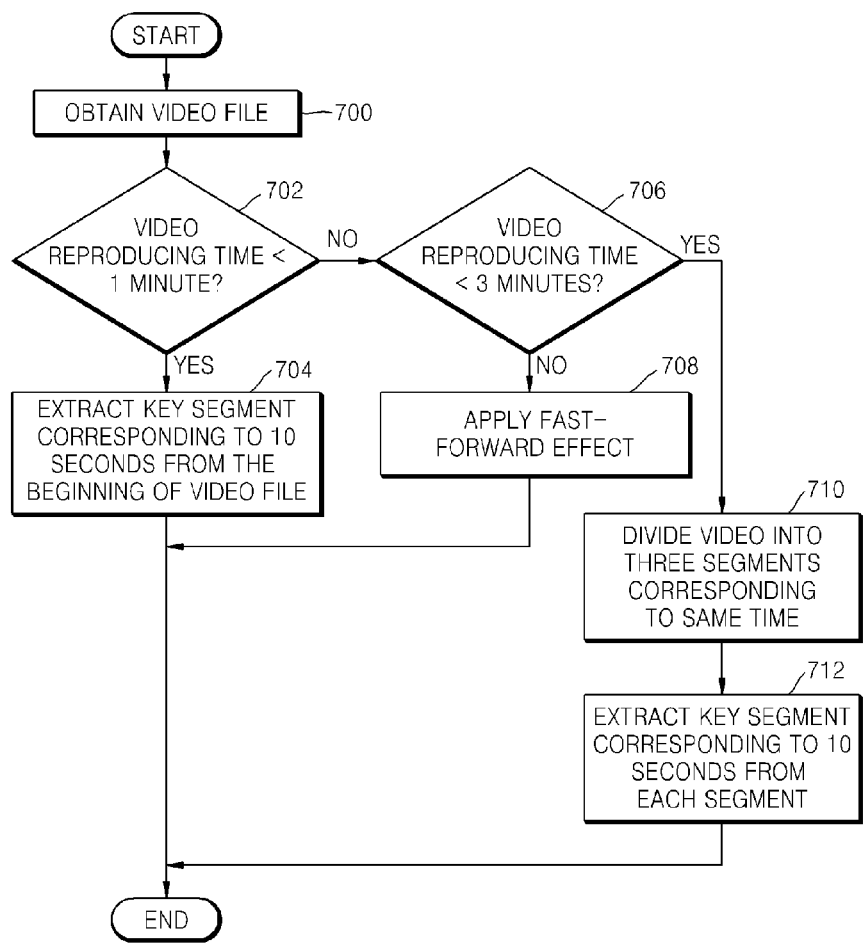
FIG. 7 is a flowchart for describing a method of applying an effect according to a file attribute according to another embodiment of the invention.

FIG. 7 is a flowchart for describing a method of applying an effect according to a file attribute according to another embodiment of the invention.

Referring to FIG. 7, in operation 700, a video file is obtained. In operation 702, it is determined whether a video reproducing time is equal to or less than one minute. If the video reproducing time is equal to or less than one minute, video data corresponding to ten seconds is extracted as a key segment from the beginning of the video file in operation 704, and ten seconds is skipped, and then video data corresponding to ten seconds is extracted as another key segment. That is, a one-minute video file is generated as a thirty-second summary video.

In operation 702, if the video reproducing time is equal to or greater than one minute, it is determined whether the video reproducing time is equal to or less than three minutes in operation 706. In operation 706, if the video reproducing time is equal to or greater than three minutes, a fast-forward effect is determined in operation 708.

In operation 706, if the video reproducing time is equal to or less than three minutes, the video is divided into three segments corresponding to the same time in operation 710, and 10-second video data is extracted as a key segment from each segment. Then, when the summary video is displayed, a layout of a display screen is reproduced as the entire display screen in a first segment. Then, the display screen is divided in half at a time corresponding to a second segment to display a video corresponding to the second segment. Then, a video corresponding to a third segment is displayed on one half of the display screen at a time corresponding to the third segment. In this instance, final frames of the videos corresponding to the first and second segments are displayed on the other half in a stopped state. Then, each segment is summarized as a key segment in operation 712.

The apparatus described herein may comprise a processor, a memory for storing program data to be executed by the processor, a permanent storage device such as a disk drive, a communications port for handling communications with external devices, and user interface devices, such as a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by a computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that may be executed in one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

A method of displaying a summary video of the invention may automatically determine various effects according to a file attribute and may automatically summarize a video so as to have the various effects and display a video summary.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of displaying a summary video, the method comprising:
   selecting a file comprising a video;
   determining different effects according to whether a number of related still images of the video is greater than or equal to a threshold value;
   if the number of related still images of the video is greater than or equal to a threshold value, then displaying the summary video generated from the related still images with a first effect; and
   if the number of related still images is not greater than or equal to the threshold value, then displaying the summary video generated from the related still images with a second effect that is different from the first effect,
   wherein the related still images are captured during recording of the video,
   wherein displaying a summary video with a first effect comprises
      when:
         the number of related still images comprised in the video is equal to or greater than a first threshold value, and
         a time interval between an initial related still image and a final related still image is equal to or greater than a second threshold value,
      then
         the summary video is generated in such a way that the video is displayed on a first area of a display screen and a related still image is displayed on a second area of the display screen while being slid in one direction, and
   wherein when the time interval between the initial related still image and the final related still image is less than the second threshold value, the summary video is generated in such a way that the video is displayed on the display screen and the related still image pops up at a time when the related still image is captured to be overlapped with the displayed video and then disappears.

2. A method of displaying a summary video, the method comprising:
   selecting a file comprising a video;
   determining different effects according to whether a number of related still images of the video is greater than or equal to a threshold value;
   if the number of related still images of the video is greater than or equal to a threshold value, then displaying the summary video generated from the related still images with a first effect; and
   if the number of related still images is not greater than or equal to the threshold value, then displaying the summary video generated from the related still images with a second effect that is different from the first effect,
   wherein the related still images are captured during recording of the video,
   wherein displaying a summary video with a first effect comprises
      when:
         the number of related still images comprised in the video is equal to or greater than a first threshold value, and
         a time interval between an initial related still image and a final related still image is equal to or greater than a second threshold value,
      then
         the summary video is generated in such a way that the video is displayed on a first area of a display screen and a related still image is displayed on a second area of the display screen while being slid in one direction, and when:
the number of related still images comprised in the video is equal to or greater than a second threshold value and less than the first threshold value, then
the summary video is generated in such a way that the video is displayed on the display screen and the related still image pops up at a time when the related still image is captured to be overlapped with the displayed video and then disappears.

3. A method of displaying a summary video, the method comprising:
selecting a file comprising a video;
determining different effects according to whether a number of related still images of the video is greater than or equal to a threshold value;
if the number of related still images of the video is greater than or equal to a first threshold value, then displaying the summary video with a first effect such that
if a time interval between an initial related still image and a final related still image is equal to or greater than a second threshold value, then the summary video is displayed on a first area of a display screen and a related still image is displayed on a second area of the display screen while being slid in one direction;
if the time interval between the initial related still image and the final related still image is less than the second threshold value, then the summary video is displayed on the display screen and the related still image pops up at a time when the related still image is captured to be overlapped with the displayed video and then disappears; and
if the number of related still images is not greater than or equal to the first threshold value, then displaying the summary video with a second effect that is different from the first effect.

4. A summary video display apparatus comprising:
a selecting unit for selecting a file comprising a video; and
a controller for:
determining different effects according to whether a number of related still images of the video is greater than or equal to a threshold value;
if the number of related still images of the video is greater than or equal to a first threshold value, then displaying the summary video with a first effect such that
if a time interval between an initial related still image and a final related still image is equal to or greater than a second threshold value, then the summary video is displayed on a first area of a display screen and a related still image is displayed on a second area of the display screen while being slid in one direction;
if the time interval between the initial related still image and the final related still image is less than the second threshold value, then the summary video is displayed on the display screen and the related still image pops up at a time when the related still image is captured to be overlapped with the displayed video and then disappears; and
if the number of related still images is not greater than or equal to the first threshold value, then displaying the summary video with a second effect that is different from the first effect.

5. A method of displaying a summary video, the method comprising:
selecting a file comprising a video;
determining different effects according to whether a number of related still images of the video is greater than or equal to a threshold value;
if the number of related still images of the video is greater than or equal to a first threshold value then displaying the summary video with a first effect such that
if a time interval between an initial related still image and a final related still image is equal to or greater than a second threshold value, the summary video is displayed on a first area of a display screen and a related still image is displayed on a second area of the display screen while being slid in one direction;
if the number of related still images comprised in the video is equal to or greater than a second threshold value and less than the first threshold value, then the summary video is generated in such a way that the summary video is displayed on the display screen and the related still image pops up at a time when the related still image is captured to be overlapped with the displayed video and then disappears; and
if the number of related still images is not greater than or equal to the first threshold value, then displaying the summary video with a second effect that is different from the first effect.

* * * * *